Patented Aug. 19, 1941

2,252,824

UNITED STATES PATENT OFFICE 2,252,824

PRODUCTION OF TRISAZO DYESTUFFS

Hermann Winkeler, Schkopau, Albert Petz, Mannheim, Werner Keller, Dessau, and Ludwig Neumann, Mannheim, Germany, assignors to General Aniline & Film Corporation, a corporation of Delaware No Drawing. Application July 11, 1939, Serial No. 283,827. In Germany July 23, 1938

8 Claims. (Cl. 260—173)

The present invention relates to trisazo dyestuffs.

We have found that violet or blue to green or black trisazo dyestuffs of the following general formula have very advantageous tinctorial properties $$A-N=N-B_1-N=N-B_2-N=N-D$$

in which A is the radical of an aromatic ortho-hydroxycarboxylic acid, $B_1$ and $B_2$ are aromatic or aromatic-heterocyclic radicals and D is the radical of an aminohydroxynaphthalene sulfonic acid the amino group of which is united with an aromatic radical containing a carboxylic acid group and a hydroxy group in ortho-position to each other. The new dyestuffs preferably contain at least two sulfonic acid groups.

Trisazo dyestuffs of the said kind may be prepared for example in the following manner: An aminohydroxybenzene- or -naphthalene-ortho-carboxylic acid, as for example 1-amino-2-hydroxybenzene-3-carboxylic acid, 1-amino-4-hydroxybenzene-3-carboxylic acid or their homologues, as well as the sulfonic acids derived therefrom, or also an aminobenzoyl- or aminobenzene-sulfonyl - aminohydroxybenzene- or -naphthalene-ortho-carboxylic acid or a sulfonic acid of the same, is diazotized (radical A) and coupled with an aromatic or aromatic-heterocyclic amino compound capable of being coupled (radical B), as for example 1-amino-3-methylbenzene, 1-amino-2.5-dimethylbenzene, 1 - amino-2-methoxy-5-methylbenzene, 1-aminonaphthalene, 1-aminonaphthalene-6- or -7-sulfonic acid, 1-amino-2-ethoxynaphthalene - 6 - sulfonic acid, 1-(3'- or 4'-aminophenyl)-3-methyl-5-pyrazolone, 1-(3-' or 4'-aminophenyl)-5-pyrazolone-3-carboxylic acid and their esters and amides. The resulting aminoazo dyestuff is then diazotized and coupled with a further aromatic or aromatic-heterocyclic amino compound capable of being coupled (radical $B_2$), as for example one of similar constitution to those above described for the radical $B_1$. The resulting aminodisazo dyestuff is then diazotized and coupled alkaline with an aminohydroxy naphthalene sulfonic acid the amino group of which is united with the radical of an aromatic ortho-hydroxycarboxylic acid (radical D). The said hydroxycarboxylic acid radical may be directly attached to the amino group, as for example in N-hydroxycarboxyphenyl-2-amino-5-hydroxynaphthalene - 7 - sulfonic acid, or also by a bridge to the amino group, such as in N-hydroxycarboxylphenylsulfonyl-2-amino-5-hydroxynaphthalene - 7 - sulfonic acid and N-substitution products thereof, or N-hydroxycarboxyphenylsulfonyl-N-methyl-2-amino-8-hydroxy-naphthalene-6-sulfonic acid or N-hydroxycarboxyphenylsulfonyl-N-ethyl-1-amino-8-hydroxynaphthalene-3.6-disulfonic acid.

The aminodisazo dyestuff $$A-N=N-B_1-N=N-B_2-NH_2$$

may also be prepared by coupling diazotized nitro amino benzenes or mono-acyl-diaminobenzenes with an amino compound capable of coupling, coupling the diazo compound of the resulting aminoazo dyestuff with an ortho-hydroxycarboxylic acid capable of coupling and reducing the nitro group or saponifying the acylamino group.

The new dyestuffs may also be prepared by diazotizing amino azo dyestuffs of the formula $$H_2N-B_2-N=N-D$$

wherein $B_2$ and D have the above identified meaning, and coupling the diazo compounds with a diazotizable amino compound (radical $B_1$), diazotizing the amino disazo dyestuff obtained and coupling with an aromatic ortho-hydroxy-carboxylic acid capable of coupling.

The new trisazo dyestuffs dye violet or blue to green or black shades. They go substantively on to cotton, viscose artificial silk or linen and usually leave any wool treated at the same time uncolored. They may be used in admixture with wool dyestuffs for dyeing mixtures of wool and cotton or of wool and viscose artificial silk. The fastness of dyeings thus produced may be improved by aftertreatment with copper or chromium salt solutions.

The following examples will further illustrate how this invention may be carried out in practice but the invention is not restricted to these examples. The parts are by weight.

Example 1

233 parts of 1-amino-2-hydroxy-3-carboxybenzene-5-sulfonic acid are dissolved in sodium carbonate solution, 69 parts of sodium nitrite are added and ice and hydrochloric acid are allowed to run into the mixture. The diazo solution is united with a soda-alkaline solution of 223 parts of 1-aminonaphthalene-7-sulfonic acid and after the addition of sodium acetate coupled in acetic acid. The whole is stirred for some time, sodium carbonate is added until a soda-alkaline reaction is produced and the aminoazo dyestuff is diazotized also by allowing the dyestuff solution to which sodium nitrite has been added to flow into hydrochloric acid and then adding sodium acetate until an acetic acid reaction is obtained.

The diazo compound is then filtered off by suction and united with a further 223 parts of 1- aminonaphthalene-7-sulfonic acid in the form of the sodium salt to form the aminodisazo dyestuff. The sodium salt of this dyestuff which separates is filtered off by suction, diazotized in the usual manner and coupled alkaline with 343 parts of N-4'-hydroxy-3'-carboxyphenyl - 2 - amino-5-hydroxynaphthalene-7-sulfonic acid:

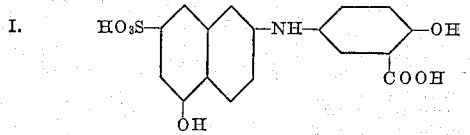

I.

to form the trisazo dyestuff. It is salted out, filtered off by suction and dried. The trisazo dyestuff yields blue shades having good fastness properties on cotton.

*Example 2*

In a manner similar to that described in Example 1, the following dyestuff is prepared: 1-amino-3-carboxy-4-hydroxy - benzene-5-sulfonic acid is diazotized and coupled with 1-aminonaphthalene, further diazotized and coupled with 1-aminonaphthalene-7-sulfonic acid, again diazotized and coupled with N-4'-hydroxy-3'-carboxyphenyl-2-amino-5-hydroxy-naphthalene-7-sulfonic acid. The trisazo dyestuff dyes vegetable fibres blue shades the fastness to washing of which is excellent after treatment with chromic salt solutions.

*Example 3*

352 parts of N-3'-aminobenzoyl-1-amino-3-carboxy-4-hydroxybenzene-5-sulfonic acid are dissolved in aqueous caustic soda solution, 69 parts of sodium nitrite are added and it is allowed to run into dilute hydrochloric acid at 20° C. A neutral solution of 223 parts of 1-aminonaphthalene-7-sulfonic acid is then added and the coupling completed by the addition of sodium acetate. The aminoazo dyestuff which separates is dissolved by the addition of caustic soda solution, 69 parts of sodium nitrite are added and diazotization effected by the addition of hydrochloric acid. After several hours, a weakly hydrochloric acid solution of 143 parts of 1-aminonaphthalene is added and coupling to the disazo dyestuff effected while stirring. It is filtered off by suction, taken up in dilute caustic alkali solution, cooled, 69 parts of sodium nitrite are added and then hydrochloric acid until the reaction is weakly acid. The resulting diazo compound is allowed to run into an alkaline solution containing 375 parts of N-4'-hydroxy-3'-carboxyphenyl-2-amino-5-hydroxynaphthalene-7-sulfonic acid.

The trisazo dyestuff thus obtained yields on cotton and viscose artificial silk a blue which acquires an excellent fastness to washing by after-treatment with chromic salt solutions.

*Example 4*

The monoazo dyestuff of the foregoing example is, as therein described, further diazotized and coupled with a neutral solution of 223 parts of 1-aminonaphthalene-7-sulfonic acid, with an addition of sodium acetate, to form the disazo dyestuff. The solution is rendered alkaline and the disazo dyestuff is salted out, filtered off by suction, brought into solution again by the addition of alkali hydroxide and 69 parts of sodium nitrite are added while cooling with ice and the compound diazotized by the addition of hydrochloric acid until the reaction is weakly acid. The diazo compound is allowed to run into an alkaline solution of 453 parts of N-4'-hydroxy-3'-carboxyphenyl-1'-sulfonyl-N-methyl - 2 - amino - 5 - hydroxynaphthalene-7-sulfonic acid:

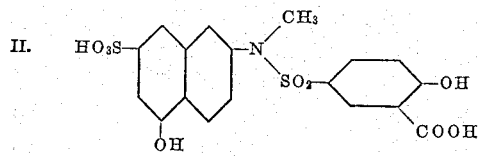

II.

The trisazo dyestuff thus obtainable dyes cotton and viscose artificial silk blue shades which acquire an excellent fastness to washing by after-treatment with chromic salt solutions.

If N-4'-hydroxy - 3' - carboxyphenyl - 1' - sulfonyl-N-methyl-2 - amino - 8 - hydroxynaphthalene-6-sulfonic acid:

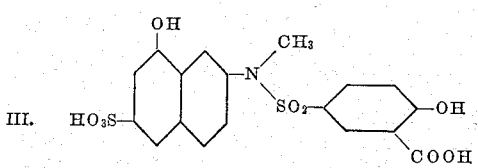

III.

be used as the last azo component, blue-grey shades of excellent fastness properties are obtained.

By selecting as end component, N-4'-hydroxy-3'-carboxyphenyl-1'-sulfonyl-N-ethyl-1 - amino-8-hydroxynaphthalene-3.6-disulfonic acid:

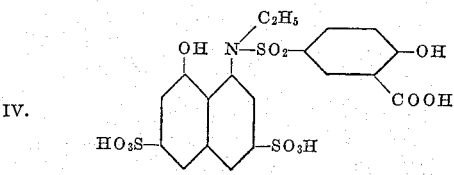

IV.

a dyestuff is formed which dyes the fibre silver-grey shades which may be further improved considerably in their fastness properties by after-treatment with chromic salt solutions.

*Example 5*

A weak hydrochloric acid solution of 121 parts of 1-amino-2.5-dimethylbenzene is added to the diazo compound of 352 parts of N-3'-aminobenzoyl-1-amino-3-carboxy-4-hydroxybenzene-5-sulfonic acid, coupling to the monoazo dyestuff being effected with the addition of sodium acetate. The monoazo dyestuff is dissolved with the addition of caustic soda solution, 69 parts of sodium nitrite are added and then hydrochloric acid until there is a weak acid reaction, the whole then being stirred for some time at about 5° C. The diazo compound is then coupled with a neutral solution of 267 parts of 1-amino-2-ethoxynaphthalene-6-sulfonic acid with an addition of sodium acetate. After completion of the coupling, the whole is rendered alkaline, salted out and the disazo dyestuff separated. It is dissolved in soda solution, 69 parts of sodium nitrite are added while cooling with ice and the whole slowly acidified with hydrochloric acid. After completion of the diazotization, it is coupled with 547 parts of N-4'-hydroxy-3'-carboxyphenyl-1'-sulfonyl-N-ethyl-1-amino-8-hydroxy - naphthalene-3.6-disulfonic acid (Formula IV) in ammoniacal solution containing pyridine.

The dyestuff yields on cotton or viscose artificial silk blue-green shades which after treatment with chromic salt solutions have remarkable fastness to washing.

Example 6

The diazo compound of 352 parts of 3'-aminobenzoyl-1-amino-3-carboxy-4-hydroxybenzene-5-sulfonic acid is coupled with 189 parts of 1-(4'-aminophenyl)-3-methyl-5-pyrazolone with an addition of sodium acetate. After completion of the formation of the dyestuff, the ochre-yellow mass is dissolved with caustic soda solution, 69 parts of sodium nitrite are added and hydrochloric acid is allowed to flow in slowly at 15° C. until a weakly acid reaction is obtained. The thick orange-brown mass is stirred for some hours and there is then added a neutral solution of 267 parts of 1-amino-2-ethoxy-naphthalene-6-sulfonic acid. The coupling is carried to completion by the addition of sodium acetate. The dyestuff is then dissolved with caustic soda solution, salted out and filtered off by suction. The disazo dyestuff is taken up with water, 69 parts of sodium nitrite are added and diazotization effected by the slow addition of hydrochloric acid at about 8° C. It is then coupled with 547 parts of N-4'-hydroxy-3'-carboxyphenyl-1'-sulfonyl-N-ethyl-1-amino-8-hydroxynaphthalene-3.6-disulfonic acid (Formula IV) in ammoniacal solution containing pyridine. The dyestuff yields clear green dyeings which become eminently fast to washing by aftertreatment for example with chromic fluoride.

By using 453 parts of N-4'-hydroxy-3'-carboxyphenyl-1'-sulfonyl-N-methyl-2-amino-5-hydroxynaphthalene-7-sulfonic acid (Formula II) instead of the last mentioned component, a green dyestuff having equally excellent fastness is also obtained.

Example 7

47.6 parts of 3- or 4-aminobenzoyl-1-amino-2-hydroxy-3-carboxy-benzene-5-sulfonic acid are diazotized and coupled in acetic acid solution with 22.4 parts of 1-aminonaphthalene-7-sulfonic acid. The resulting azo dyestuff is diazotized and the diazo compound coupled with 30 parts of 1-aminonaphthalene-7-sulfonic acid.

The disazo dyestuff is then salted out and filtered off. It is then dissolved in sodium carbonate solution and diazotized by the addition of sodium nitrite and introduction of the mixture into dilute hydrochloric acid. The resulting diazo compound is filtered off and introduced at 0° C. into a solution of 59 parts of N-4'-hydroxy-3'-carboxyphenyl-1'-sulfonyl-N-methyl-2-amino-5-hydroxynaphthalene-7-sulfonic acid (Formula II) to which 60 parts of pyridine and 57 parts of 20 per cent ammonia have been added.

After completion of the coupling the whole is heated and the trisazo dyestuff salted out. It dyes cotton and viscose artificial silk blue-green shades. By aftertreatment with chromic salt solutions an excellent fastness to washing of the dyeing is obtained.

By using 1-aminonaphthalene as the second coupling component instead of 1-aminonaphthalene-7-sulfonic acid, a similar dyestuff is obtained.

Example 8

The diazo compound of the disazo dyestuff according to Example 7 from 47.6 parts of 4'-aminobenzoyl-1-amino-2-hydroxy-3-carboxyphenyl-5-sulfonic acid, 22.4 parts of 1-aminonaphthalene-7-sulfonic acid, and 30 parts of 1-aminonaphthalene-7-sulfonic acid is introduced into an aqueous solution containing 60 parts of N-4'-hydroxy-3'-carboxyphenyl-1'-sulfonic-N-methyl-2-amino-8-hydroxynaphthalene-6-sulfonic acid (Formula III), 25 parts of sodium carbonate and 30 parts of pyridine. After coupling is completed, the whole is heated and the dyestuff salted out with sodium chloride. It goes on to cotton and viscose artificial silk with a bluish grey color. By aftertreatment with chromic salt solutions a considerable increase in the fastness to washing is obtained.

Example 9

47.5 parts of 4'-aminobenzoyl-1-amino-2-hydroxy-3-carboxybenzene-5-sulfonic acid are diazotized and coupled in the presence of acetic acid with 22.4 parts of 1-aminonaphthalene-7-sulfonic acid. The resulting aminoazo dyestuff is then diazotized and coupled in acetic acid solution with 13.3 parts of 1-aminonaphthalene. After completion of the coupling, the disazo dyestuff is filtered off, dissolved in soda solution and diazotized. The diazo compound is then introduced into a solution of N-4'-hydroxy-3'-carboxyphenyl-2-amino-5-hydroxynaphthalene-7-sulfonic acid (Formula I) in 200 parts of water, 55 parts of ammonia and 20 parts of pyridine. After completion of the coupling, the whole is heated and the dyestuff salted out. It dyes cotton and viscose artificial silk greenish blue shades of color. The dyeings which have been aftertreated with chromic salt solutions have a very good fastness to washing.

What we claim is:

1. Azo dyestuffs corresponding to the general formula

A—N=N—B₁—N=N—B₂—N=N—D in which A stands for the radical of an aromatic ortho-hydroxy carboxylic acid selected from the group consisting of the benzene and naphthalene series, B₁ and B₂ stand for members of the group consisting of radicals of the benzene and naphthalene series and phenyl pyrazolone radicals and D stands for the radical of an aminohydroxynaphthalene sulfonic acid coupled alkaline the amino group of which is united with a radical of the benzene series containing a carboxylic acid group and a hydroxy group in ortho-position to each other.

2. Azo dyestuffs corresponding to the general formula

A—N=N—B₁—N=N—B₂—N=N—D in which A stands for the radical of an ortho-hydroxycarboxyphenyl sulfonic acid, B₁ and B₂ stand for members of the group consisting of radicals of the benzene and naphthalene series and phenyl pyrazolone radicals and D stands for the radical of an aminohydroxynaphthalene sulfonic acid coupled alkaline the amino group of which is united with a radical of the benzene series containing a carboxylic acid group and a hydroxy group in ortho-position to each other.

3. Azo dyestuffs corresponding to the general formula

A—N=N—B₁—N=N—B₂—N=N—D in which A stands for the radical of an ortho-hydrocarboxyphenyl sulfonic acid, B₁ and B₂ stand for members of the group consisting of radicals of the benzene and naphthalene series and phenyl pyrazolone radicals and D stands for the radical of a 2-amino-5-hydroxy-naphthalene-7-sulfonic acid attached to the azo group shown in 6-position, the amino group being united with a radical of the benzene series containing a carboxylic acid group and a hydroxy group in ortho-position to each other.

4. Azo dyestuffs corresponding to the general formula

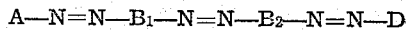

in which A stands for the radical of an ortho-hydroxycarboxyphenyl sulfonic acid, $B_1$ and $B_2$ stand for members of the group consisting of radicals of the benzene and naphthalene series and phenyl pyrazolone radicals and D stands for the radical of a 2-amino-8-hydroxynaphthalene-6-sulfonic acid attached to the azo group shown in 7-position, the amino group being united with a radical of the benzene series containing a carboxylic acid group and a hydroxy group in ortho-position to each other.

5. Azo dyestuffs corresponding to the general formula

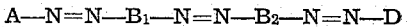

in which A stands for the radical of an ortho-hydroxycarboxyphenyl sulfonic acid, $B_1$ and $B_2$ stand for members of the group consisting of radicals of the benzene and naphthalene series and phenyl pyrazolone radicals and D stands for the radical of a 1-amino-8-hydroxynaphthalene-3.6-disulfonic acid attached to the azo group shown in 7-position, the amino group being united with a radical of the benzene series containing a carboxylic acid group and a hydroxy group in ortho-position to each other.

6. Azo dyestuffs corresponding to the general formula

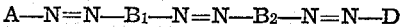

in which A stands for the radical of an ortho-hydroxycarboxyphenyl sulfonic acid, $B_1$ and $B_2$ stand for naphthalene radicals attached to the azo groups shown in 1- and 4-position, and D stands for the radical of a 2-amino-5-hydroxynaphthalene-7-sulfonic acid attached to the azo group shown in 6-position, the amino group being united with a radical of the benzene series containing a carboxylic acid group and a hydroxy group in ortho-position to each other.

7. Azo dyestuffs corresponding to the general formula

in which A stands for the radical of an ortho-hydroxycarboxyphenyl sulfonic acid, $B_1$ and $B_2$ stand for naphthalene radicals attached to the azo groups shown in 1- and 4-position, and D stands for the radical of a 2-amino-5-hydroxynaphthalene-7-sulfonic acid attached to the azo group shown in 6-position, the amino group being united with the radical of salicyclic acid.

8. Azo dyestuffs corresponding to the general formula

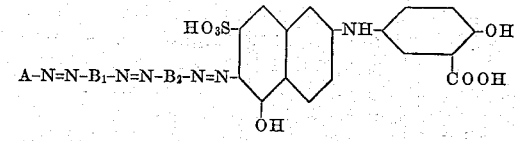

in which A stands for the radical of an ortho-hydroxycarboxyphenyl sulfonic acid and $B_1$ and $B_2$ stand for naphthalene radicals attached to the azo groups shown in 1- and 4-position.

HERMANN WINKELER.
ALBERT PETZ.
WERNER KELLER.
LUDWIG NEUMANN.